United States Patent [19]

Staniszewski

[11] Patent Number: 5,427,412
[45] Date of Patent: Jun. 27, 1995

[54] REMOVABLE WEB GUIDE ASSEMBLY

[75] Inventor: Gary Staniszewski, Shelby Township, Mich.

[73] Assignee: AlliedSignal Inc., Morristown, N.J.

[21] Appl. No.: 220,754

[22] Filed: Mar. 31, 1994

[51] Int. Cl.6 .................. B60R 22/24; B60R 22/18
[52] U.S. Cl. .................. 280/808; 297/483; 248/223.1; 403/353
[58] Field of Search .............. 280/808, 801.1, 801.2; 297/482, 483, 485, 486; 248/223.1; 403/353, 325, 315

[56] References Cited

U.S. PATENT DOCUMENTS

| | | | |
|---|---|---|---|
| 3,185,246 | 5/1965 | Maurer | 280/801.1 |
| 3,626,556 | 12/1971 | Struck | 297/483 |
| 4,225,185 | 9/1980 | Krzok | 297/468 |
| 4,322,097 | 3/1982 | Provensal | 280/808 |
| 4,334,701 | 6/1982 | Takada | 280/804 |
| 4,398,749 | 8/1983 | Hipp et al. | 280/808 |
| 4,469,352 | 9/1984 | Körner et al. | 280/808 |
| 4,473,243 | 9/1984 | Ogawa | 280/808 |
| 4,579,368 | 4/1986 | Kawade et al. | 280/801.2 |
| 4,611,825 | 9/1986 | Patterson | 280/808 |
| 4,702,491 | 10/1987 | Meyer | 280/808 |
| 4,786,081 | 11/1988 | Schmidt | 280/808 |
| 4,840,405 | 6/1989 | Escaravage | 280/808 |
| 4,986,570 | 1/1991 | Quinting | 280/808 |
| 5,215,332 | 6/1993 | De Sloovere | 280/801.1 |

FOREIGN PATENT DOCUMENTS

| | | | |
|---|---|---|---|
| 1556738 | 2/1969 | France | 280/801.1 |
| 1925651 | 11/1970 | Germany | 280/808 |
| 2255897 | 11/1992 | United Kingdom | 280/808 |
| 1461661 | 2/1989 | U.S.S.R. | 280/808 |

Primary Examiner—Margaret A. Focarino
Assistant Examiner—Peter C. English
Attorney, Agent, or Firm—Markell Seitzman

[57] ABSTRACT

A web guide (10) adapted to be secured to and removed from a post (12), the post of the type having a narrow part (14) and a larger head (16), the web guide comprising: a support frame (30) having a first end (32) and a second end (50,) the first end including an opening (34) comprising a wide portion (36) having a diameter larger than the head of the post and a small diameter portion (38) having a diameter smaller than the head. The thickness of the frame is not greater than the spacing between a post surface and a support surface (20). The second end (50) includes a slit (52) for receipt of a seat belt webbing (58). The web guide includes a pivoted lever (100), located on the frame, having a blocking end (102) positioned on one side of a fulcrum (134) and extending into the larger diameter portion (36) and movable from: (a) a first position in blocking engagement with a side of the head, when the head is positioned about the narrow diameter portion (38), for prohibiting relative movement of the head toward the wide diameter portion, and (b) to an elevated position away from the head whereby the frame can be moved to position the head within the wide diameter portion and the frame removed therefrom.

5 Claims, 2 Drawing Sheets

U.S. Patent   June 27, 1995   Sheet 1 of 2   5,427,412
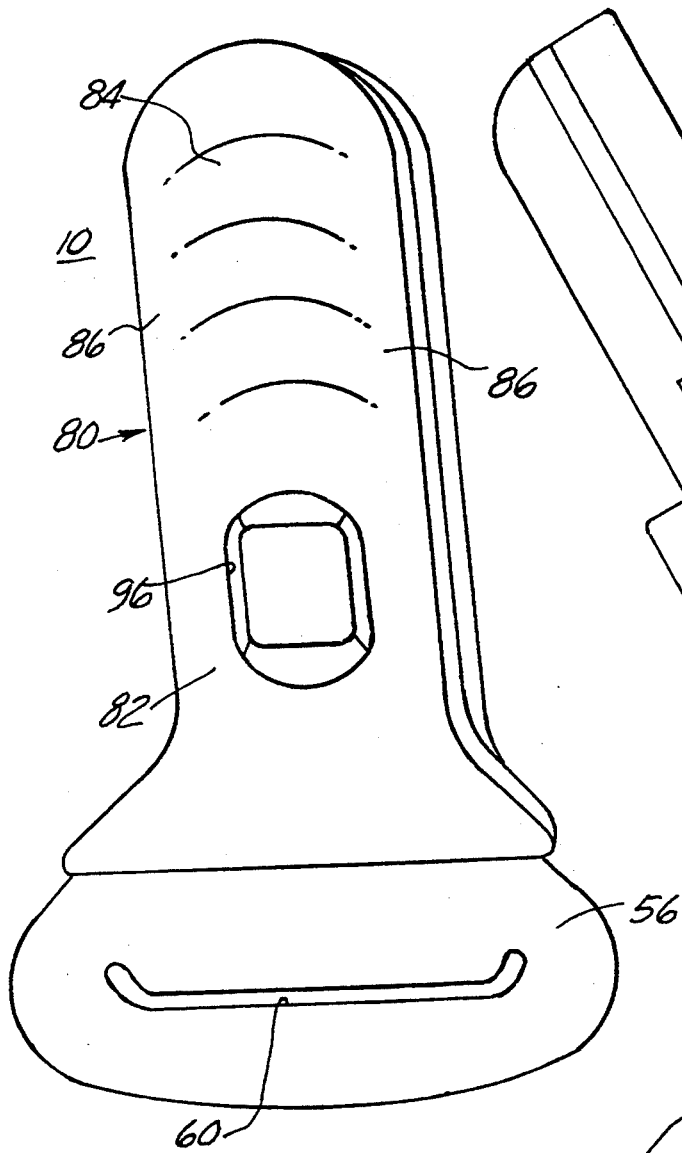
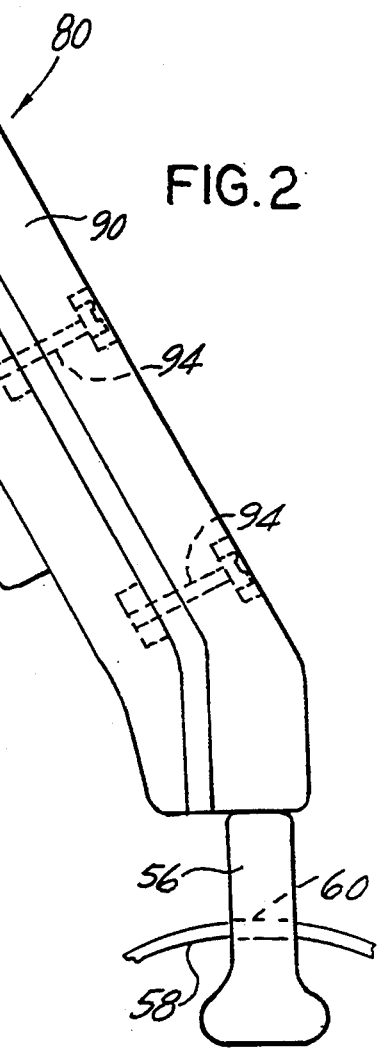
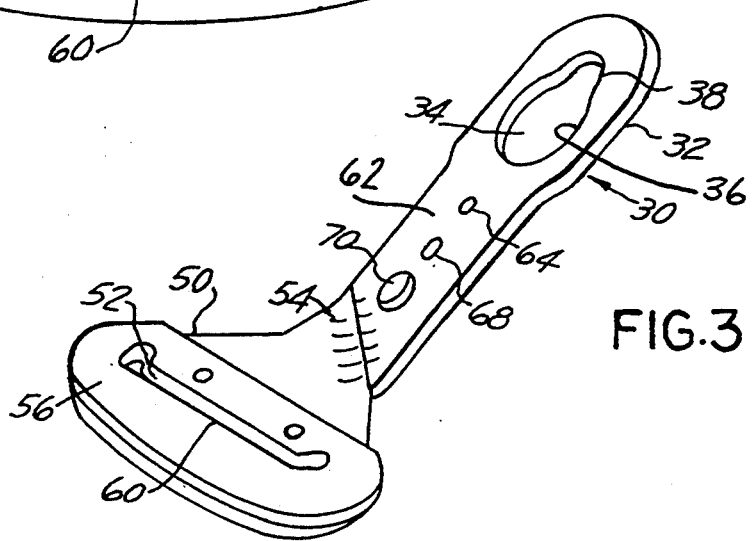

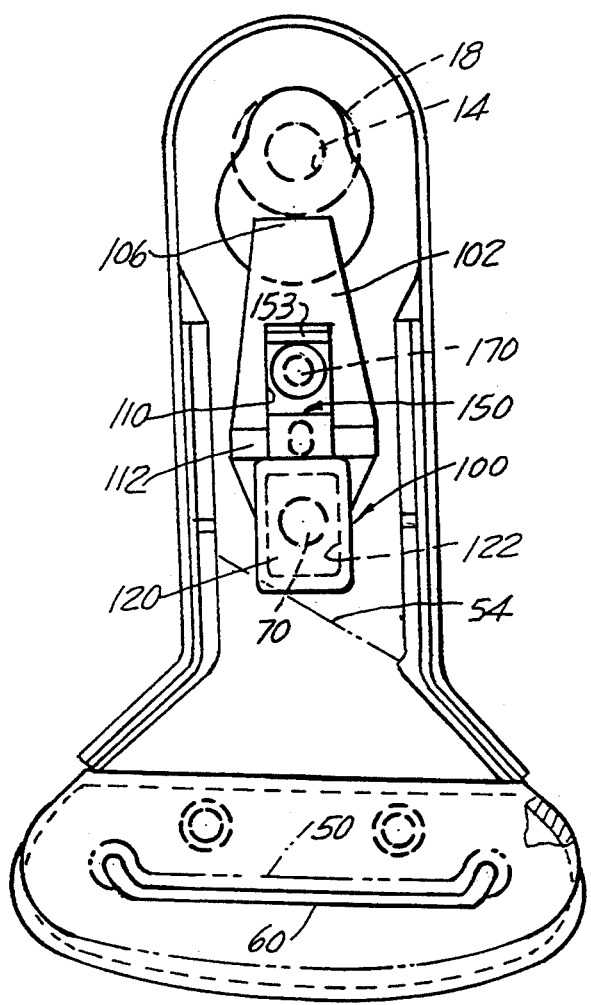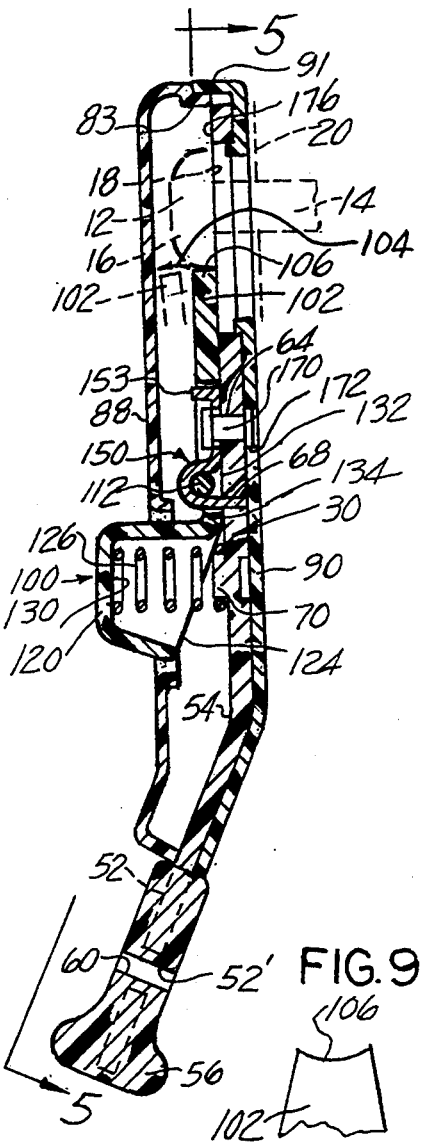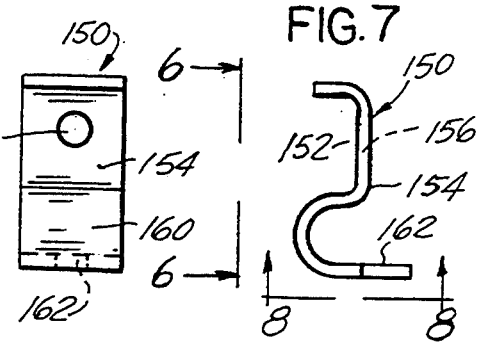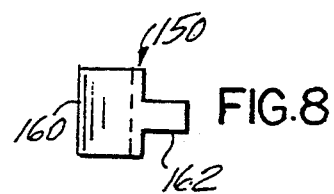

REMOVABLE WEB GUIDE ASSEMBLY

BACKGROUND AND SUMMARY OF THE INVENTION

The present invention relates generally to web guides, D-rings and the like for supporting a portion of a seat belt webbing. Specifically, the present invention relates to a removable web guide assembly.

A typical seat belt or safety restraint system includes a retractor mounted to a vehicle seat or to a vehicle body part and a length of webbing extending therefrom, a buckle and tongue. In a three-point restraint system, a portion of the webbing extends through a web guide or D-ring (used interchangeably herein) typically located at or above the height of the occupant's shoulder and mounted to the vehicle typically at the: B-pillar or to the seat. The D-ring is most usually rotatably mounted, permanently affixed to the B-pillar by a fastener. Utility vehicles, such as vans are designed to permit the rear seats to be removed to enlarge the cargo storage area. To permit the unobstructed loading of cargo, in addition to removing the seat, it is desirable to also remove the safety restraint system from the vehicle to ease loading in the cargo area. In those vehicles where the web guide is permanently attached to the vehicle, it is difficult and undesirable to remove it from the vehicle. Further, during the assembly of the vehicle, the requirement to permanently mount the web guide adds to the assembly and labor cost. The time for assembly and related cost can be reduced by incorporating the concept of a removable web guide which permits the final installation of the seat belt system in a more timely and cost effective manner.

Accordingly, the invention comprises: a web guide, adapted to be secured to and removed from a post, the post of the type having a narrow part and a larger head, where a surface of the head or post is spaced from a cooperating support surface. The web guide comprises: a support frame having a first end and a second end, the first end includes an opening having a wide portion having a diameter larger than the head of the post and a small diameter portion having a diameter smaller than the head but larger than the narrow part of the post. The thickness of the frame, and a lower cover, is not greater than the spacing(s) between the post surface and the support surface. The second end includes a slit for receipt of seat belt webbing and a pivoted, lever located on the frame, having a blocking end positioned on one side of a fulcrum. The tip of the blocking end, extends into the larger diameter portion of the opening so that it can be moved by the head of the post. The lever is movable from: (a) a first portion in blocking engagement with a side of the head, when the head is positioned about the narrow diameter portion, for prohibiting movement of the frame to move the head toward the wide diameter portion, and (b) to an elevated positioned away from the head whereby the frame can be moved to position the head within the wide diameter portion and the frame removed therefrom. The lever includes a second side extending oppositely from the fulcrum including a release button thereon for lowering and raising the second side causing the raising and lowering of the blocking end.

It is an object of the present invention to provide a removable web guide or D-ring that is easily and quickly disconnected from a post.

Many other objects and purposes of the invention will be clear from the following detailed description of the drawings.

BRIEF DESCRIPTION OF THE DRAWINGS

In the drawings:

FIGS. 1 and 2 show front and side views of the exterior of a web guide using the present invention.

FIG. 3 illustrates an orthogonal view of a support frame used of the web guide.

FIG. 4 illustrates a side cross-sectional view.

FIG. 5 illustrates a front cross-sectional view.

FIG. 6, 7 and 8 illustrate views of a hinge bracket.

FIG. 9 illustrates an alternate embodiment of the invention.

DETAILED DESCRIPTION OF THE DRAWINGS

With reference to the drawings there is shown a removable web guide or D-ring, generally shown as 10. The web guide is adapted to be secured to and removed from a post or fastener 12 having a narrow or shaft portion 14 and a head 16. A surface of the head 16, typically a bottom 18, or groove is spaced from a cooperating support surface 20, such as the B-pillar or other portion of the vehicle or similar mounting surface on a seat. The web guide 10 includes a, preferably metal, support frame 30 which is shown in isolation in FIG. 3. A first end 32 of the frame 30 includes an oblong opening 34 comprising a wide diameter portion 36 and a narrower diameter portion 38. The wide diameter portion 36 is larger than the diameter of the head of the post or fastener, while the narrower diameter portion 38 is narrower than the head, but wider then the fastener or post shaft 14. The other end 50 of the frame includes a slit 52. The end 50 is covered by a synthetic material 56 such as plastic molded thereon, which narrows the slit 52 to a height slightly greater than the thickness of the seat belt webbing 58. A surface 60 of the material 56 provides a structural support surface having a relatively low friction coefficient, to permit the webbing to easily slide thereon. The frame may be generally flat or as shown in FIGS. 3 and 5, the frame may be bent along a line generally shown as 54. In this way, the upper portion of the frame can lie generally flat against the support surface, while the end 50, which supports the webbing, is bent outwardly to present the seat belt webbing in a preferred orientation relative to the occupant.

The middle portion 62 of the frame includes a first and a second opening 64 and 68 and a stamped upraised boss 70, the purpose of which will be described below. The frame 30 is enclosed by a two-part cover 80. The cover includes a upper cover portion 82 having a domed profile, that is, it is higher along the central portion, generally shown as 84, then at it sides 86. The covering includes a lower cover portion 90 that matingly engages the upper portion cover with the coated end 50 extending therefrom. The two cover portions are connected by a plurality if fasteners 94. The cover portions may be attached together by other means such as by ultrasonic welding or interfitting members that snap together. The covert portions 82 and 90 include interfitting projections 83 and 91 to provide for proper alignment of the cover portions. The upper cover portion has an oval opening 96 which as described receives a button.

Fitted to the frame is a pivoting lever generally shown as 100. The lever includes a blocking end 102, that is movable from a first position, laying parallel to the frame to a second position (see phantom line) upwardly raise therefrom. The motion of the blocking end of the lever is generally shown by arrow 104. As can be seen from FIG. 5, the tip 106 of the blocking end 102 of the lever 100 is essentially flat and the blocking end has a central opening 110 therein. The portion of the blocking end opposite, the tip 106 includes an integrally formed rod or bar 112. Extending from the rod is another portion 122 of the lever 100 that includes a button portion generally shown as 120. The button portion is formed in a hollowed out part of lever portion 122. The lower surface 124 of lever portion 122 is tapered. A compression spring 126 is fit over the boss 70 and contacts the underside 130 of the button 120 to provide an upward bias force thereto. A surface 132 of the frame, proximate the intersection of the lower surface 124 and the rod 112 provides a fulcrum 134 about which the blocking end is rotated to its blocking position in response to the spring bias force. The lever is maintained in position by a bent metal bracket generally shown as 150 in FIGS. 6, 7, and 8. The bracket includes a U-shaped portion 152, the bottom 154 of which fits flat against the frame and within opening 110. An end 153 of the bracket is slightly spaced from the blocking end 102 to permit it to be rotated over the tip of the end 153. Extending from the U-shaped portion is a curved member 160 having an elongated end or tab 162. The bottom of the U-shaped portion includes an opening 156. As can be seen, the curved portion 160 entraps the bar or rod 112 and the extending tab 162 is fitted in opening 68. The bracket is further positioned in place by use of a fastener such as a rivet 170 received through opening 64. As can be seen, the lower cover portion is provided with a recess 172 to receive an end of the rivet.

When it is desired to mount the web guide 10 to the post or fastener 12, the post head 16 is positioned within the larger diameter portion 36 of the opening 34, and the web guide is laid against support surface 36. In this orientation, the top of the head is below the blocking end of the lever, and urges the lever away from the frame. Further, in this position, the side 176 of the frame 30 is below surface 18 of the post 12. Thereafter, the web guide is slid downwardly, such that the narrow portion 14 of the post enters the narrowed diameter portion 38 of the opening 34. In this position, the blocking end 102 returns to its flat orientation against the frame and is positioned near or gently touching a side of the head 16. As can be seen, in this configuration, the web guide 10 is blockingly or lockingly mated with the post or fastener. In addition, the web guide, because of the orientation of the blocking end to the fastener and because the frame is positioned below the head of the post or fastener, can be rotated freely about the narrow portion 14 of the post or fastener.

When it is desired to remove the web guide from the support surface 20, the user depresses the button portion 120 of the lever causing a blocking end 102 to be lifted from the frame to a position generally shown by the phantom lines 102 above the head 16. In this orientation of the blocking end, the web guide 10 can be slid upwardly causing the head 16 of the post or fastener 12 to be positioned within the larger diameter portion 36 and the frame removed.

FIG. 9 shows an alternate embodiment in which the tip of the blocking end is shaped conformably with the shape of the sides of the head. In this embodiment, the head anti tip are circularly shaped.

Many changes and modifications in the above described embodiment of the invention can, of course, be carded out without departing from the scope thereof. Accordingly, that scope is intended to be limited only by the scope of the appended claims.

I claim:
1. A web guide (10): adapted to be secured to and removed from a post (12), the post having a narrow part (14) and a larger head (16), the web guide comprising:
a support frame (30) having a first end (32) and a second end (50), the first end including an opening (34) comprising a wide portion (36) having a diameter larger than the head of the post and a small diameter portion (38) having a diameter smaller than the head, the thickness of the frame being not greater than the spacing between a post surface and a support surface (20); the second end (50) includes a slit (52) for receipt of a seat belt webbing (58);
a rigid pivoted lever (100), located on the frame, having a bend therein, a tip of the bend in combination with the frame forming a fulcrum, a blocking end (102) positioned on a first side of the fulcrum (134) and extending over the wide portion (36) and movable from: (a) a first position in blocking engagement with a side of the head, when the head is positioned about the small portion (38), for prohibiting relative movement of the head toward the wide portion, and (b) to an elevated position away from the head whereby the frame can be moved to position the head within the wide portion and the frame removed therefrom and a second side (122) extending oppositely from the fulcrum (134) including a release button 120 thereon for lowering and raising the second side causing the raising and lowering of the blocking end, including spring means (126), received interior to the button, interconnecting the second side and the frame for providing a bias force thereto to urge the blocking end toward a positioned of engagement with the post.

2. A web guide (10):
adapted to be secured to and removed from a post (12), the post having a narrow part (14) and a larger head (16), the web guide comprising:
a support frame (30) having a first end (32) and a second end (50), the first end including an opening (34) comprising a wide portion (36) having a diameter larger than the head of the post and a small diameter portion (38) having a diameter smaller than the head, the second end (50) includes a slit (52) for receipt of a seat belt webbing (58);
pivoted lever means (100) for engaging and disengaging the post, located on the frame, having a blocking end (102) positioned on a first side of a fulcrum (134) and extending over the wide portion (36) and movable from: (a) a first position in blocking engagement with a side of the head, when the head is positioned about the small portion (38), for prohibiting relative movement of the head toward the wide portion, and (b) to an elevated position away from the head whereby the frame can be moved to position the head within the wide portion and the frame removed therefrom, wherein the pivoted lever means includes a bracket opening in the blocking end and a bar (112) across one side of the bracket opening, and wherein bracket means (150) for securing the pivoted lever means is provided having a first portion (152) fitting in the bracket opening and a second portion (160) enveloping the bar and wherein the blocking end is relatively movable with regard to the bracket means.

3. The apparatus as defined in claim 2 wherein the pivoted lever means (100) includes a second side (122) extending oppositely from the fulcrum (134) including a release button 120 thereon for lowering and raising the second side causing the raising and lowering of the blocking end, including spring means (126), received interior to the button, interconnecting the second side and the frame for providing a bias force thereto to urge the blocking end toward a positioned of engagement with the post.

4. The apparatus as defined in claim 2 wherein a tip of the blocking end (62) is straight.

5. The apparatus as defined in claim 2 including a tab (162) of the second portion that is fixedly fastened to the frame.

* * * * *